Sept. 8, 1970　　　　　　J. R. HALE　　　　　3,527,664
MEMBRANE STRUCTURAL MODULE HAVING DOUBLE
RULED QUADRIC SURFACES
Filed July 1, 1968　　　　　　　　　　　　2 Sheets-Sheet 1
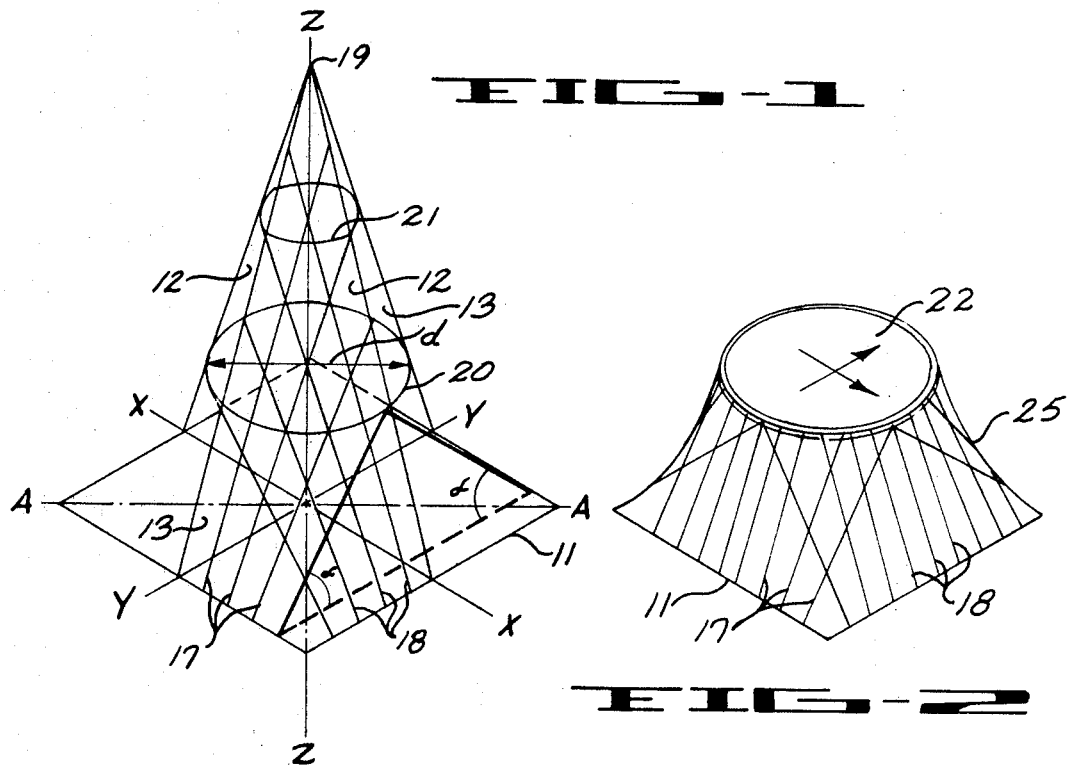
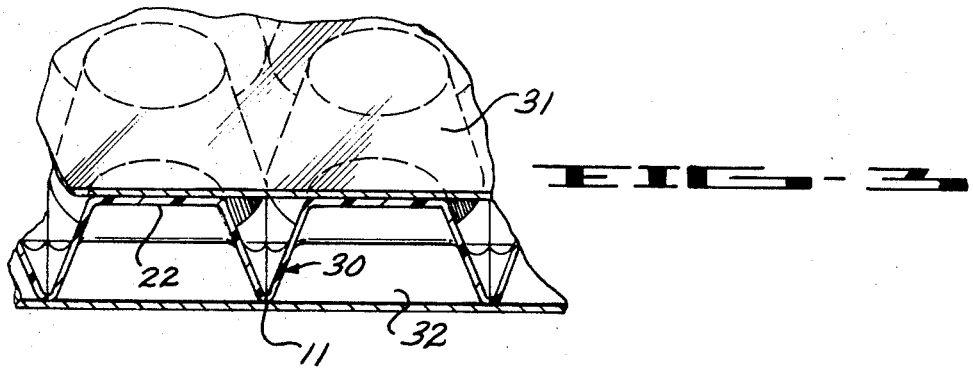
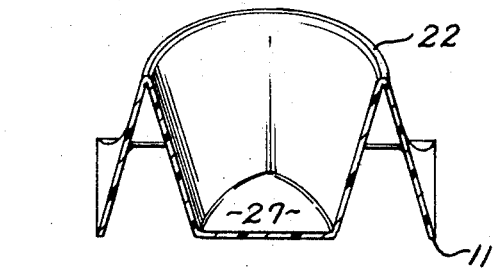
INVENTOR.
JESSE R. HALE
BY
Sokolski & Wohlgemuth
ATTORNEYS Sept. 8, 1970
J. R. HALE
3,527,664
MEMBRANE STRUCTURAL MODULE HAVING DOUBLE
RULED QUADRIC SURFACES
Filed July 1, 1968
2 Sheets-Sheet 2
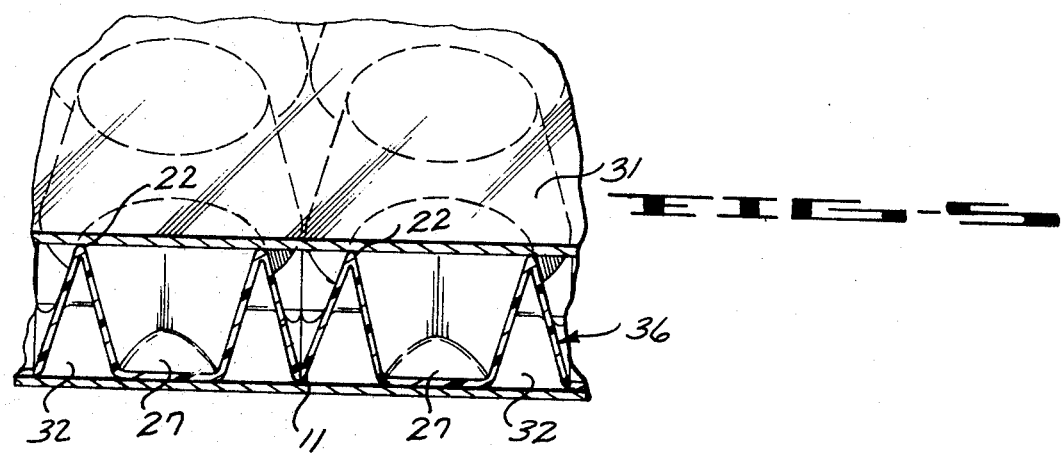
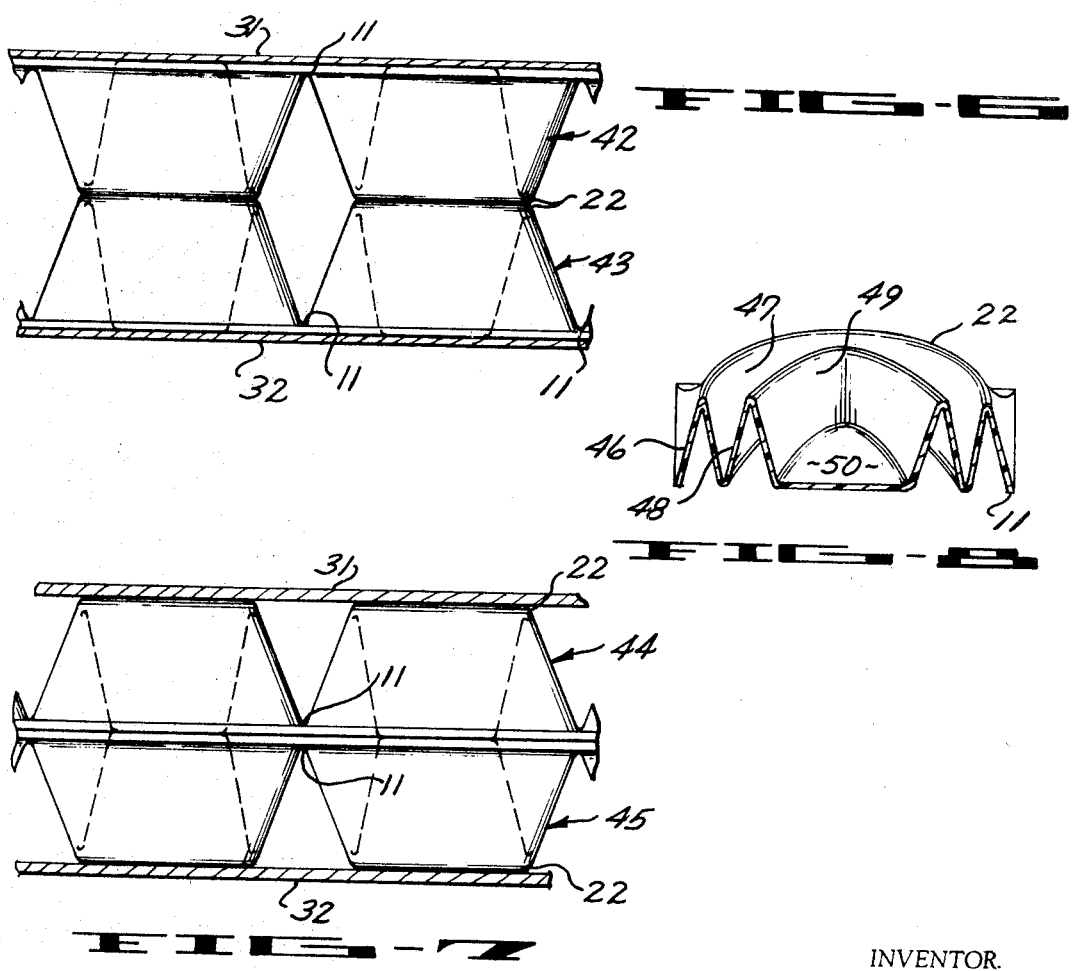
INVENTOR.
JESSE R. HALE
BY
Sokolski & Wohlgemuth
ATTORNEYS United States Patent Office 3,527,664
Patented Sept. 8, 1970

3,527,664
MEMBRANE STRUCTURAL MODULE HAVING
DOUBLE RULED QUADRIC SURFACES
Jesse R. Hale, 14020 Budlong Ave.,
Gardena, Calif. 90247
Continuation-in-part of application Ser. No. 621,899,
Mar. 9, 1967. This application July 1, 1968, Ser.
No. 741,600
Int. Cl. B32b 3/12, 3/28; G09b 23/04
U.S. Cl. 161—68                    11 Claims

ABSTRACT OF THE DISCLOSURE

A membrane panel structure of double ruled quadric surfaces with the rulings oriented to form biaxial multi-angled truss patterns within the surface. This structure may be used to particular advantage in forming the core of sandwich panels and establishing an isotropic truss pattern which can be oriented with the major fiber stress pattern of the panel surfaces. In an embodiment thereof, the ruled surfaces are formed from a square sheet of material which is deformed along its Z axis so that it has a node extending from the original square sheet, the edges of which form a base, the node having a terminating diameter equal to one-half the length of the diagonal of the base square. In another embodiment, the node is additionally deformed inwardly to form a folded portion extending back to the base plane.

This application is a continuation-in-part of my co-pending application Ser. No. 621,899, filed Mar. 9, 1967.

This invention relates to membrane panel structures, and in particular to such structures useful in forming panels and sandwich panel cores.

Sandwich panel members of the prior art are generally formed with structural cores produced from paper, reinforced plastics or metal, which may be in the form of square, round or hexagonal cells. Certain structures have also been produced from flat sheets of formable material which are deformed in the same or alternate opposite directions by means of pin members. These fall in three geometric surface classifications: (1) the folded plane surface as shown in Pat. No. 2,481,046 to Scurlock and Pat. No. 3,086,899 to Smith; (2) the double curved surface as shown in Pat. No. 3,227,598 to Robb; (3) the combination of the plane and double curved surfaces as shown in Pat. No. 2,858,247 to De Swart. This invention relates to a fourth classification, warped surfaces.

In the fabrication of structural panels or cores for sandwich panels, two main design criteria must be considered. These are the provision of adequate strength to stand up against external force for prolonged periods of time, and the provision of adequate rigidity so that any deformations either temporary or permanent will not lead to deterioration and loss of strength, or result in undesirable bending of the structure which might be detrimental, both to its physical utilization or psychologically, insofar as personnel using such structure. It is also highly desirable to have as high as possible a strength-to-weight ratio, especially where the material is to be utilized in vehicles such as aircraft. Also, in commercial products, the strength-to-weight ratio determines the amount of material required and therefore affects cost.

The use of plastics in structures has many advantages, including the ease of forming thermoplastic materials, the noncorroding nature of plastics and the ability to make plastics to a wide range of performance specifications to meet individual application requirements. The thermoforming plastics, i.e., those which would be suitable for the fabrication of structure from sheet material, with the use of heat, have an inherently low modulus of elasticity. The structural geometry of this invention overcomes this difficulty by providing a configuration which by virtue of its geometry imparts a high moment of inertia to the structure, and thus enables the construction of core panels of high structural integrity from thermoforming plastic. Therefore, the use of materials of better physical properties such as metal and reinforced plastics show even greater structural advantages.

The structure of this invention will now be described in connection with the accompanying drawings, of which:

FIG. 1 is a schematic drawing illustrating the basic geometry of the structure of the invention, FIG. 2 is a perspective view illustrating a structural element of one embodiment of the device of the invention, FIG. 3 is a perspective drawing illustrating a sandwich panel formed with structural elements of the embodiment of FIG. 2, FIG. 4 is a perspective view illustrating the structural element of a second embodiment of the device of the invention, FIG. 5 is a perspective view illustrating a sandwich panel formed with elements of the type shown in FIG. 4, FIG. 6 is an elevational view illustrating a sandwich panel formed from elements of the type shown in FIG. 4 with their nodal portions abutting, FIG. 7 is an elevational view illustrating a sandwich panel formed from structural elements of the type illustrated in FIG. 4 with their base portions abutting, and FIG. 8 is a perspective view illustrating a structural element of a third embodiment of the device of the invention.

Briefly described, the structure of this invention is a membrane structural member comprising a rectilinear base portion, a nodal portion spaced from the base portion and a double ruled quadric surface inter-connecting the base and nodal portions. In its most elemental form, the quadric surface is comprised of a family of straight lines normal to the base edge and running between the base and the plane of termination. These lines can be described as rectilinear generators, skew lines or lines of a double ruled warped surface.

In the specific embodiments described, the base of the structural elements is in the form of a square which is synthesized by the combination of four of the elemental units just described. In these specific embodiments, the structure is formed by deforming a square of flat material along its Z axis to form a substantially round nodal portion, this nodal portion having a diameter equal to one-half the length of the diagonal of the square base, and defining a plane of minimum eccentricity of the basic geometric configuration; at minimum eccentricity, the hyperbolas of the geometric configuration fall between a circle and its inscribed octagon. As to be clearly pointed out further on in the specification, the double ruled surfaces provide an isotropic truss pattern in the end structure and afford optimum structural integrity in the membrane, by reducing stress to that of tension, compression and shear, and virtually eliminating bending. This is created by the rulings running from nearly vertical to a 45° angle, offering straight line paths for the major portion of the stresses. When the core axes are aligned with the fiber stress patterns of the panel surfaces, these normally run perpendicular to the edges of the panel. The geometry of the device of this invention is analogous to the modified Warren truss which has stood as the criterion of structural design for over a century. The modified Warren truss consists of a post perpendicular to the upper and lower chords and positioned at the vertex of the diagonal struts. Referring to FIG. 1, the post of a Warren truss represents the most vertical rulings shown in FIG. 1, lying in the XZ and YZ planes. The diagonals establishing the angle α represent the diagonal struts of Warren. It can further be seen that the membrane surface of this invention furnishes struts or truss elements for all of the transition angles between the most vertical and the optimum diagonal.

Referring again to FIG. 1, a schematic drawing illustrating the basic geometry of the structure of the invention is shown. It is to be noted that this figure does not represent an actual practical configuration of the device of the invention but is utilized in the formation of such structures. The geometric figure has a square base 11. Along the apothems of such base designated in the figure as the "X" axis (X—X) a pair of triangular walls 12 are constructed, the bases of the triangles formed by these walls running along the apothems, one of the sides of the triangles running along the "Z" axis to the apex of the figure and the hypotenuses of the triangles running down from the apex to base 11. A similar set of walls 13 is constructed along the "Y" axis (Y—Y) running normal to the X axis. The figure is thus divided into four equal segments by the triangular walls.

Assuming the triangular walls to be rigid, the basic membrane structure of the invention could be created by stretching material over the form defined by base member 11 and wall members 12 and 13. The surfaces thus formed are double ruled quadric surfaces or warped surfaces, which are generated by a first set of rulings 17 and a second set of rulings 18, which are represented by lines extending normally from the sides of the base member to the edges of opposite wall members 12 and 13 respectively.

Cross sections such as 20 and 21 taken through the figure parallel to base 11 have a hyperbolic shape at all points between base 11 and the apex 19 of the figure. However, the degree of curvature of the hyperbola is different for each point with a point of minimum eccentricity being achieved at a point where the hyperbolas fall between a circle and its inscribed octagon. The circle diameter for this point of minimum eccentricity is equal to one-half the dimension of the diagonal (A—A) of base 11. For the particular case where the base angle α is 45°, the point of minimum eccentricity will occur at an altitude above base 11 which is equal to one-half the dimension of one side of the base. This height of minimum eccentricity of course will change with a change in the base angle α, or to put it conversely, if we change the altitude at which the point of minimum eccentricity is to occur, the base angle α of our figure will change accordingly.

All of these relationships can readily be established by simple geometric analysis. Assuming that cross section 20 is the point of minimum eccentricity, it is to be noted that for cross sections higher up on the figure, such as for example cross section 21, the sides of the cross sectional figures become straighter and straighter as we approach apex 19, while finally at the apex point, they, at least theoretically, form a square, returning to the geometrical configuration of the base.

It is to be noted that in rotating the figure about its Z axis, the surface in going from one straight line edge of a wall 12 to the adjoining straight line edge of a wall 13 exhibits in radial cross section an increase in curvature to a maximum parabola running from the corner of the square. Similarly, the curvature of the family of hyperbolas approaches a circle as we go from the base to the point of minimum eccentricity at cross section 20. It is also to be noted that rulings 17 and 18 represent the truss patterns which are from nearly vertical to 45° in the structure and indicate how the stresses will be handled by the structural membrane under load. Thus it can be seen that the double ruled quadric surface of the structure of this invention provides a biaxial truss pattern. One of the major advantages of this geometry is that a maximized number of ruled lines of the surface can be in contact with the top and bottom sheets of a sandwich panel and the disposition of these rulings can be arranged so as to create a true membrane structure, i.e., one in which all stress falls within the surface of the structure. Let us now turn to the various figures to examine specific embodiments of the structure of the invention.

Referring now to FIG. 2, a first embodiment of the device of the invention is illustrated. This first embodiment corresponds to the geometrical figure of FIG. 1 between base portion 11 and substantially circular cross section 20. Base portion 11 is square and has side portions 25 extending therefrom and terminating in flat circular nodal portion 22 which is parallel to base portion 11. The surfaces of side portion 25 are, as described in connection with FIG. 1, double ruled quadric surfaces. Rulings 17 and 18 are shown drawn on the surfaces of the figure to assist in the explanation of the functioning of the structure. As already noted, for a substantially round nodal portion 22, the diameter of this portion will be one-half the dimension of the diagonal of base 11. The use of such a substantially round node at minimum eccentricity is not essential to the structure but facilitates the tooling in that a rounded die is easier to make than the hyperbolic configurations which correspond to other portions of the geometric figure. An octagonally shaped node which also approximates the hyperbola at the point of minimum eccentricity may also be used.

For rulings 17 and 18 running at a 45° angle from the base (angle α as shown in FIG. 1) the altitude of node 22 above base 11 should be one-half the length of one side of base 11. This particular dimensional configuration provides optimum ability in the structure for the handling of plate bending loads. As the altitude of minimum eccentricity node 22 is increased, the ability to handle compression loads increases. Thus, these various parameters can be designed to meet particular application requirements. The structure of FIG. 2 can be conveniently formed with appropriate tooling from flat sheets of deformable material such as plastic. One convenient manner in which such forming can be accomplished is as follows. A square section of deformable flat sheet material, such as a plastic, is first bound in a form to define the base of the structure. A pin in the shape of a frustum of a cone having a flat top portion which has a diameter equal to one-half the diagonal of the base of the structure established by the form, the base of the cone having a diameter equal to one side of such base, and an altitude equal to the depth of desired draw, is used to draw the center of the square sheet to the desired depth. It can be seen that the cone in this instance will provide the guides for the straight line portions along the "X" and "Y" axes as shown in FIG. 1, the material being drawn therebetween having a double ruled quadric surface configuration.

Referring now to FIG. 3, the incorporation of a plurality of the structural elements of FIG. 2 in a sandwich panel structure is illustrated. A plurality of core members 30 of the type described in connection with FIG. 2, are formed in a single sheet or formed separately and joined together and then sandwiched between two flat sheets 31 and 32 to form a sandwich panel. As can be seen, the nodal portions 22 abut against the surface of panel 31 while the base portions 11 abut against the surfaces of panel 30 to provide an integral unit capable of withstanding both compression and bending loads. As already explained, depending upon the particular application requirements, the structure of core 30 can be designed to provide optimum strength for either bending loads or compressional loads, or a desired compromise for these two types of loads.

Referring now to FIG. 4, a basic element of a second embodiment of the structure of the invention is illustrated. This structure is similar to that of FIG. 2 except for the addition of a counter node 27 which involves a deformation of node 22 back in the direction of base 11. Counter node 27 preferably extends all the way back to base 11 and continues the basic geometry illustrated in FIG. 1 folded back upon itself. Thus, the folded back portion 27 has the surface configuration of the portion of the geometric figure between cross sectional portions 20 and 21 of FIG. 1. The shape of the counter node 27 comprises four hyperbolic portions joined together, this in accordance with the cross sectional point 21 of FIG. 1. This folded back structure of FIG. 4 provides greatly increased rigidity and strength in that the truss patterns are thus continued back again providing a double set of trusses.

Referring now to FIG. 5, a plurality of membrane surfaces in accordance with the configuration of FIG. 4 are shown in a repetitive truss core 36 which is sandwiched between a pair of flat sheets 31 and 32.

Referring now to FIG. 6, a further embodiment of the structure of this invention of FIG. 4 as incorporated into a sandwich panel is illustrated. In this embodiment, core members 42 and 43 have their base portions 11 attached to flat panel members 31 and 32 respectively, the nodal portions 22 of the cores being attached to each other. This particular configuration is especially effective in handling plate bending of evenly distributed loads, in that the truss lines are contiguous with each other throughout the structure, and the core has additional rigidity due to continuous surfaces in the plane of 11.

Referring now to FIG. 7, a further combination of truss cores of FIG. 4 between a pair of sandwich panels is illustrated. In this embodiment, the base portions 11 of two sets of core structures 44 and 45 are abutted against each other with the nodal portions 22 of these cores being attached to opposing surfaces of panels 31 and 32 to form a sandwich panel structure. This particular configuration has the advantage of being continuous at the neutral axis and can be readily deformed to single and double curved panel shapes.

Referring now to FIG. 8, a basic structural element of a further embodiment of the device of the invention is illustrated. This membrane structure has a triple fold, each folded unit continuing the surface configuration of the basic geometry shown in FIG. 1. Thus double ruled quadric surface 46 extends up from the base of the structure. Double ruled quadric surface 47 continues as an extension of surface 46 running back to the base of the structure, double ruled quadric surface 48 continuing from the end of surface 47 with surface 49 running back to the base to terminate the structure with node 50. This folded structure shows that for a given load imposed on a sandwich panel, the geometry can be optimized for maximum structural integrity.

The structure of this invention thus enables the fabrication of a rigid high strength membrane structure for use in sandwich panel construction from thermoforming plastics and other materials including reinforced plastics, metal, glass and paper.

I claim:
1. A membrane structural module comprising:
a polygonal base portion defining a first plane,
a nodal portion having a substantially hyperbolic perimeter spaced from said base portion and defining a second plane parallel to said first plane, and
membrane surface portions interconnecting said base and nodal portions, said surface portions having a double ruled quadric configuration.

2. The structure of claim 1 wherein said nodal portion has a substantially round perimeter.

3. The structure of claim 1 and additionally including first and second sheet members, the nodal portion of said structure being attached to one of said sheet members, the base portion of said structure being attached to the other of said sheet members to form a sandwich panel.

4. The structure of claim 1 wherein said nodal portion is folded back on itself to form a second node extending back to the base portion.

5. The structure of claim 4 wherein the second node is in turn folded back on itself to the basic nodal portion.

6. The structure of claim 1 wherein the rulings of said surface portion are oriented to form biaxial truss patterns.

7. The structure as of claim 6 and further including first and second sheet members, said structure being sandwiched between said sheet members to form a sandwich panel, said biaxial truss patterns being oriented to the stress pattern of the surface sheets of a sandwich panel.

8. The structure of claim 6 and additionally including a second membrane core structure similar to the first membrane core structure, the nodal portions of said structures being attached together in overlying relationship.

9. The structure of claim 8 and additionally including a first and second panel, the base portion of one of said structures being attached to one of said panels, the base portion of the other of said structures being attached to the other of said panels to form a sandwich panel structure.

10. The structure of claim 6 and additionally including a second membrane structure similar to the first membrane structure, the base portions of said membrane structures being attached together in overlying relationship.

11. The structure of claim 10 and additionally including a first and second panel, one of said panels being attached to the nodal portion of one of said membrane structures, the other of said panels being attached to the nodal portion of the other of said membrane structures to form a sandwich panel structure.

References Cited

UNITED STATES PATENTS

| | | | |
|---|---|---|---|
| 2,077,950 | 4/1937 | Mopin | 52—80 |
| 2,391,997 | 1/1946 | Noble. | |
| 2,481,046 | 9/1949 | Scurlock | 161—137 X |
| 2,668,327 | 2/1954 | Steele | 161—68 X |
| 2,809,908 | 10/1957 | French | 161—127 X |
| 2,858,247 | 10/1958 | De Swart | 161—137 X |
| 2,912,940 | 11/1959 | Baroni | 161—125 X |
| 2,950,726 | 8/1960 | Kuhl et al. | |
| 3,025,935 | 3/1962 | Ensrud et al. | 52—618 X |
| 3,071,216 | 1/1963 | Jones et al. | 161—68 X |
| 3,086,899 | 4/1963 | Smith et al. | 161—131 X |
| 3,151,712 | 10/1964 | Jackson | 52—615 |
| 3,197,357 | 7/1965 | Schulpen | 161—130 X |
| 3,206,895 | 9/1965 | Ridder et al. | 52—630 X |
| 3,227,598 | 1/1966 | Robb | 161—161 X |
| 3,300,942 | 1/1967 | Horstman | 52—80 X |
| 3,349,525 | 10/1967 | Payne | 52—615 X |
| 3,461,632 | 8/1969 | Kuhne | 161—68 X |

FOREIGN PATENTS

| | | |
|---|---|---|
| 150,122 | 1/1951 | Australia. |
| 1,123,817 | 2/1962 | Germany. |
| 112,558 | 11/1964 | Czechoslovakia. |

OTHER REFERENCES

Howard, S. "Useful Curves and Curved Surfaces," architectural record, January 1959, pp. 185–189.

Cundy and Rollett, Mathematical Models, Oxford Univ. Press (1961), pp. 169, 175–187.

ROBERT F. BURNETT, Primary Examiner
W. M. SCHWARZE, Assistant Examiner

U.S. Cl. X.R.
35—34; 52—618; 161—69, 127, 131